March 1, 1955  W. A. WILDHACK  2,703,013
PNEUMATIC CONTROL AND METERING SYSTEM
Filed April 18, 1949
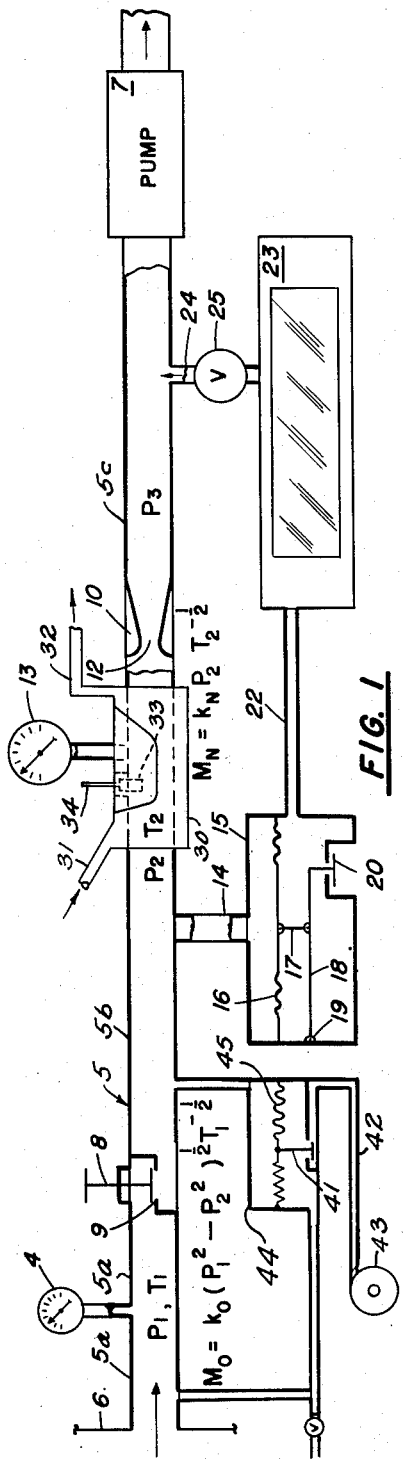
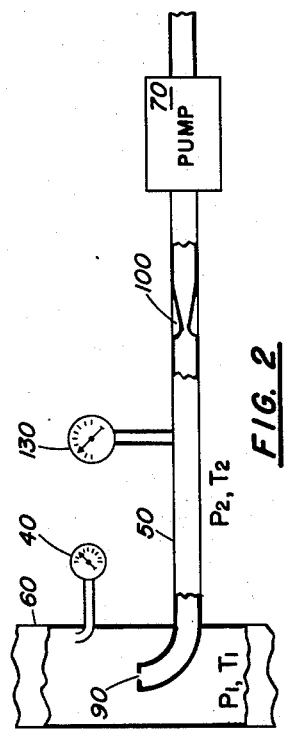
Inventor
WILLIAM A. WILDHACK

United States Patent Office 2,703,013
Patented Mar. 1, 1955

2,703,013

PNEUMATIC CONTROL AND METERING SYSTEM

William A. Wildhack, Arlington, Va.

Application April 18, 1949, Serial No. 88,201

8 Claims. (Cl. 73—357)

(Granted under Title 35, U. S. Code (1952), sec. 266)

This invention relates to a device for pneumatically making measurements of physical quantities such as temperature, flow, and pressures, through measurement of dynamic gas pressures in a flow line.

More particularly, the present invention relates to means embodying two restrictions, one of which is a nozzle, spaced apart in a flow line through which gas is drawn or forced by differential pressure, and absolute pressure gages indicating gas pressure at the entrances to the restrictions, whereby pressure ratios serve to indicate one or more of the characteristics of the state of the gas or its flow. The term "restriction" as used here and in the claims is intended to include any constricted flow channel, such as a valve or simple orifice, either fixed or variable, and any type of nozzle suitable to the purposes of the invention.

The term "nozzle" as used herein and in the claims refers to any restriction which by virtue of its shape has the property that when the ratio of throat or exit pressure to entrance pressure is less than a so-called critical ratio (roughly 0.5), sonic velocity is attained at the throat, and the mass discharge no longer depends on the value of the downstream pressure.

In the present invention, gas flows through two restrictions (in series), one of which is a nozzle operating with sonic throat velocity so that discharge is independent of the downstream pressure. The other restriction may be an orifice, or a nozzle operating at pressure ratios either greater or less than critical. The restrictions may be fixed or adjustable, and for the preferred embodiments, the second, or downstream, restriction is a nozzle operating under critical discharge conditions. A vacuum pump is used, if necessary, to ensure critical discharge; nozzles with divergent exhaust sections, or diffusers, may be used to minimize pressure drop. With such an arrangement, the ratio of absolute pressures at the entrances of the two restrictions depends on their relative sizes and the ratio of entrance temperatures. Absolute pressures are determined by gages of conventional types appropriately connected. The ratio of these pressures may be used to measure the ratio of temperatures at the restriction entrances with a sensitivity of one part in a thousand or better over a range of 2000° C. If the gas is at a known temperature at one of the restrictions, the temperature at the other may be thus determined. With the same arrangement, the temperatures being constant or known, the intermediate pressure is a direct measure of mass flow. A sensitivity of better than 0.1% is possible in this measurement. For given temperatures, the device can be used as a "pressure divider," and the intermediate pressure may be controlled by adjusting the restrictions.

The operation of the device to be described is based on this phenomenon of nozzle discharge independent of downstream pressure, which has been known for many years and is derivable in straightforward fashion from the formulas for adiabatic flow. Flow measurements have often been made utilizing this principle. The extension of structure and arrangement in the present invention permits the measurement of temperatures and other pressures, and furnishes a dynamic system for process control.

The principles of operation of the invention may be better understood with reference to the approximate equations of gas flow through orifices and nozzles. For an orifice, $$M_o = k_o (P_1^2 - P_2^2)^{\frac{1}{2}} T_1^{-\frac{1}{2}} \quad (1)$$

where $M_o$ is the mass flow of gas, $k_o$ is the orifice constant appropriate to the particular gas, $P_1$ and $T_1$ are pressure and temperature of the gas at the entrance, and $P_2$ is the discharge pressure.

For a nozzle operating at critical discharge $$M_n = k_n P_e T_2^{-\frac{1}{2}} \quad (2)$$

where $P_e$ and $T_2$ are the pressure and temperature of the gas entering the nozzle. If an orifice and nozzle are in series, so that the entrance pressure for the nozzle is the discharge pressure for the orifice, $P_e = P_2$. If the nozzle is discharging into low pressure so that critical discharge occurs, the above equations may be equated, since the same mass flow must pass through both restrictions for an equilibrium condition. Hence $$\frac{P_2}{P_1} = \left(1 + \frac{k_n^2}{k_o^2} \frac{T_1}{T_2}\right)^{-\frac{1}{2}} \quad (3)$$

With a different $k_o$, the same equation holds approximately when the orifice is replaced by a nozzle not operating at critical discharge. If two nozzles are in series, each operating at critical discharge, $$\frac{P_2}{P_1} = \frac{k_{n_1}}{k_{n_2}} \left(\frac{T_2}{T_1}\right)^{+\frac{1}{2}} \quad (4)$$

The ratio of absolute pressures at the entrances, is seen to be only a function of the restrictions, and the temperatures, and is independent of the final discharge pressure. Equation 3 may be rewritten in terms indicating temperature $T_1$ of gas upstream from the first nozzle restriction as follows:

$$T_1 = T_2 \frac{k_o^2}{k_n^2} \left(\frac{P_1^2}{P_2^2} - 1\right) \quad (5)$$

For a clear understanding of the structure of the invention reference is made to the drawings wherein:

Fig. 1 diagrammatically illustrates one suitable embodiment and components.

Fig. 2 shows a more simplified arrangement for use in temperature indication.

In Fig. 1 a pipe 5, which for most practical purposes need be only a fraction of an inch in diameter, is connected at its inlet end through a wall 6 to a source of gas such, for example as the exhaust line of a jet engine or the like. If the gas pressure at the source is too low to satisfy the requirements of the invention, a vacuum pump 7 may be connected to the discharge end of the pipe. At or adjacent to the inlet end of the pipe there is installed a restriction of fixed or adjustable area, either an orifice or a nozzle, but which as shown is a variable orifice 9 of a valve 8. Spaced downstream from this restriction there is a nozzle 10 providing a second restriction 12. The pressure and temperature of entering gas are designated $P_1$ and $T_1$ respectively. The absolute pressure $P_1$ is indicated by the gage 4, which is so connected as to measure total pressure. The pressure and temperature at the entrance to the second restriction (nozzle 10) are $P_2$ and $T_2$. The downstream or outlet pressure $P_3$ is assumed sufficiently low for critical discharge.

In the description following, the flow line section, upstream from the first restriction 9, is indicated as 5a, the section between restrictions as 5b and the section downstream from the second restriction 12, as 5c, 5 indicating the flow line as a whole.

An absolute pressure gage 13 is connected into the pipe to register $P_2$, and may also be calibrated to indicate $T_1$ under certain conditions. The adjustable orifice 9 could be a fixed orifice or nozzle for some purposes. The nozzle 10 has a divergent section following the throat, which is useful in some conditions to reduce pressure drop, but is not essential in all embodiments, as critical discharge may be obtained with a rounded approach followed by a short straight section. In order to insure a constant temperature condition between restrictions 9 and 12, particularly adjacent the inlet to nozzle 12, the flow line is provided with a steamer water cooling jacket 30, having an inlet 31 and outlet 32. Also a thermometer well 33 may be formed in the flow line casing to receive thermometer 34.

For control of the pressure of large volumes of gas, a connection 14 is made to the flow line section 5b to convey gas under pressure P₂ into a controller casing 15 that is divided by a flexible diaphragm 16, the latter also sealing the casing against gas escape. A link 17 connects the diaphragm with a lever 18, pivoted at 19 for controlling the flow of atmospheric air through a valve 20. The space below the diaphragm is connected through a chamber 23 of relatively large volume and by way of a fixed or manually adjustable restriction 25 which may be a valve, in conduit 24 to a region of lower pressure, as, for example, the pipe connected to vacuum pump.

*Operation*

(1) As a controller: For any setting of valve 8, $P_2$ will come to some definite value since, according to Equation 3 or 4, if $T_1$, $T_2$, and $P_1$ are constant (or if $P_1$ is constant and $T_2/T_1$ is constant) $P_2$ varies with $k_o$.

The restriction is adjusted to give the desired pressure $P_2$, which remains constant except for fluctuations due to variations of inlet pressure or of ambient temperature. Pressure instruments to be calibrated or compared may be connected through the pipe 14 or into the flow line 5b so as to be between the orifice and the nozzle (or between two nozzles), but the volumetric capacity should be small to minimize time lag in attaining equilibrium pressure. To control large volumes, the valve 25 is opened so that it can draw air from chamber 23 and form a pressure relationship between chamber 23 and 5c similar to that between 5b and 5c. With valve 25 open the pressure $P_4$ in chamber 23 tends to equalize with pressure $P_2$ in flow line section 5b with the aid of valve 20, chamber 23 receiving more air through valve 20 when its pressure falls below $P_2$, since the valve 20 is controlled by $P_2$.

To control flow or heat in a process that affects $T_1$ or $P_1$ and thus $P_2$, pressure $P_2$ may operate controls directly through various servo-mechanisms such as that of the diaphragm 45 in casing 44, connected between conduit sections 5a and 5b, and operating valve 41 in the pressure line of pump 43 or indirectly through intermediate control devices. Since the sensing pressure $P_2$ is dynamically maintained, considerable control power may be taken directly from the sensing element.

(2) For measuring temperature (valve 25 closed): The sensitivity of measurement is greater with two nozzles, both operating at critical discharge, as may be seen by differentiating Equations 3 and 4.

$$\frac{dP_2}{P_2} = \frac{1}{2}\frac{dT_2}{T_2}\left(1 - \frac{P_2^2}{P_1^2}\right), \quad T_1 = C$$

the value of the second term being minus (—) for $T_2 = C$. From the Equations 3 and 4, if $P_1$ is constant or known, $k_o$ and $k_n$ constant, $$P_2 = f(T_1, T_2)$$

and if pipe 5 is made long and perhaps finned or water cooled or thermostatted to make $T_2$ constant, then $$P_2 = f(T_1)$$

For temperature measurements over a large range, the restriction 9 is chosen or adjusted for $P_2 = $ say, $0.8P_1$ when $T_1 = T_2$, and introduced into the gas to be measured. $P_2$ is read on the gage or barometer 13 and $T_1$ can then be computed from the Equation 3 (or 4), or read directly on a properly calibrated scale that either may be included as part of the gage 13 or may comprise part of a separate instrument. $P_1$ is constant or known.

Alternatively, if $T_1$ is known or constant, and the section of the pipe 5 adjacent to nozzle 10 is allowed to come to a new temperature $T_2$, by the influence of surrounding gas or fluid temperature, then $T_2$ can be determined from $P_2$.

A simplified device for taking temperature is shown in Fig. 2 and will be described later.

(3) As a pressure divider: The intermediate pressure $P_2$ varies directly with $P_1$, for two nozzles, or as a simple function of $P_1$ for an orifice and nozzle, and therefore $P_1$ may be determined by measuring $P_2$. This permits a sensitive and accurate pressure measuring device of limited range (zero to $P_2$) to be used to measure much larger pressures (zero to $P_1$).

(4) As a flow meter: The stream is introduced and the orifice 9 is adjusted to maintain $P_1$ at normal, or known value. The value of $P_2$ gives the mass flow $M_n$ from the nozzle equation. The device is very sensitive for this purpose.

When it is desired to measure temperatures of liquids, or of gases which are corrosive, or of uncertain composition, these fluids are passed over and around the flow line at the appropriate restriction, so that the working fluid (air or another gas chosen as suitable) comes to the temperature of the surroundings before entering the restriction.

It has now been seen that device of Fig. 1 provides a multi-purpose instrument which is simple and low in cost; and which for most uses is sensitive and accurate and of wide range.

As previously indicated, temperature $T_1$ can be measured by closing valve 25 and thus, in effect removing the parts 14 to 23. In Fig. 2, which shows a simplified instrument especially designed for measuring temperatures the parts 14 to 25 have been actually removed, by omission. The elements, actually shown in Fig. 2 (40, 50, 60, 70, 90, 100 and 130) correspond to the elements 4 to 13 of Fig. 1. The essential difference in the retained parts resides in the substitution of the simple, fixed orifice 90 for the valved orifice 9 and placing it directly in the fluid line 60, where it preferably faces upstream.

In all of the uses of the device, it may in theory be calibrated on the basis of measured geometry of the restrictions, and the known thermodynamic properties of the gas used as the working fluid. However, in practice it is found that careful calibration of the device under the expected operating condition, using other accurate means for determining temperature and pressure, can obviate much tedious calculation, and is, in any event, a desirable check on computed characteristics. Calibration is particularly needed when orifice-nozzle combination is used, or the nozzle-nozzle combination with only the second operating at critical discharge condition. Once calibrated over certain ranges of temperatures and pressures with one gas, it may be used to determine the comparative thermodynamic properties of another gas over those ranges.

The sensitivity of the device rests on this feature of the invention, that the variable to be determined is made a simple or direct function of absolute pressure, and measurements of the pressures can be made with commonly available instruments, such as aneroid or mercurial barometers or manometers, with high accuracy (easily 1 part in 10,000).

In some applications of the device, it may be that the pressure $P_3$ is known, as when discharging to the atmosphere. Under these conditions, the second restriction may be an orifice, if the first restriction is a nozzle.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A pneumatic measuring device, comprising a gas flow line, two series non-capillary restrictions in said line at least one of which is a nozzle, means for forcing gas through said flow line at pressures sufficient to establish a critical discharge through said nozzle, means for determining the absolute pressures of gas entering said restrictions, and means in said flow line between said restrictions for maintaining said flow line temperature constant in the region adjacent said nozzle.

2. The measuring device as described in claim 1 in which one of said restrictions is an orifice and the other a nozzle, with the orifice at the outlet end of the flow line.

3. The measuring device as described in claim 1 in which one of the restrictions is an orifice and the other a nozzle, with the orifice at the inlet end of the flow line.

4. A pneumatic temperature measuring device, comprising a gas flow line, two series restrictions in said line in which both are nozzles, means for forcing gas through said flow line at pressures sufficient to establish critical discharges through said nozzles, means for determining the absolute pressures of gas entering said restrictions, and means in said flow line between said restrictions for maintaining said flow line temperature constant.

5. The measuring device as described in claim 1 in which the constant temperature maintaining means between restrictions includes excess radiation areas forming a part of said flow line for securing approximate equalization of the flow line temperature with ambient temperatures.

6. A pneumatic measuring device comprising a gas flow line, two series non-capillary restrictions in said line at least one of which is a nozzle, means for forcing gas through said flow line at pressures sufficient to establish a critical discharge through said nozzle, means for determining the absolute pressure of gas entering the upstream restriction, means external to said flow line between said restrictions for maintaining said flow line temperature constant in the region adjacent said nozzle, and means connected to said flow line between said restrictions for indicating pressure in the flow line between restrictions.

7. A device for measuring one of the thermo-dynamic parameters of a gas at a selected zone in a flow line, comprising a flow line, two series connected nozzles defining selected and secondary zones in said flow line upstream from each nozzle, means for causing gas to flow through said line at such rate that both nozzles operate at critical discharge, and means for obtaining values of the parameters in the secondary zone and one parameter in the selected zone, whereby the unknown parameter in the selected zone may be determined.

8. A device for measuring one of the thermodynamic parameters of a gas at a selected zone in a flow line comprising a flow line, two restrictions series connected in said flow line the downstream restriction being formed as a nozzle, said restrictions defining selected and secondary zones in said flow line upstream from each restriction, means for causing gas to flow through said line at such rate that the nozzle operates at critical discharge, and means for obtaining values of the parameters in the secondary zone and one parameter in the selected zone, whereby the unknown parameter in the selected zone may be determined.

References Cited in the file of this patent

UNITED STATES PATENTS

| | | |
|---|---|---|
| 503,337 | Uehling et al. | Aug. 15, 1893 |
| 554,323 | Uehling et al. | Feb. 11, 1896 |
| 773,684 | Speller | Nov. 1, 1904 |
| 1,630,307 | Norwood et al. | May 31, 1927 |
| 1,630,318 | Tate | May 31, 1927 |
| 1,697,344 | Campbell | Jan. 1, 1929 |
| 1,850,133 | Muenzinger | Mar. 22, 1932 |
| 2,100,978 | Rheinlander | Nov. 30, 1937 |
| 2,112,682 | Ryder | Mar. 29, 1938 |
| 2,119,288 | Raymond | May 31, 1938 |
| 2,549,621 | Moore, Jr. | Apr. 17, 1951 |
| 2,549,622 | Moore, Jr. et al. | Apr. 17, 1951 |
| 2,549,623 | Moore, Jr. | Apr. 17, 1951 |

FOREIGN PATENTS

| | | |
|---|---|---|
| 246,975 | Germany | May 15, 1912 |
| 782,791 | France | June 12, 1935 |
| 883,062 | France | Mar. 15, 1943 |

OTHER REFERENCES

Stuart et al.: Mechanical Eng., vol. 58, #8, August 1936, pp. 479, 480, 481.

Aeronautical Engineering Review, vol. 7, #3, March 1948, p. 23.